(12) United States Patent
Smed

(10) Patent No.: US 7,891,613 B2
(45) Date of Patent: Feb. 22, 2011

(54) LOWER ARM FOR FPM SUPPORT HAVING INDENTED CABLE TRAY SUPPORT

(75) Inventor: Ole Falk Smed, Calgary (CA)

(73) Assignee: Trade Management Group Limited, Denver, CO (US)

( * ) Notice: Subject to any disclaimer, the term of this patent is extended or adjusted under 35 U.S.C. 154(b) by 96 days.

(21) Appl. No.: 11/946,986

(22) Filed: Nov. 29, 2007

(65) Prior Publication Data

US 2008/0128566 A1    Jun. 5, 2008

(51) Int. Cl.
*F16L 3/00*    (2006.01)
(52) U.S. Cl. .......................... 248/65; 248/56; 174/72 A
(58) Field of Classification Search ............... 248/49, 248/56, 65, 74.2, 73, 230.7, 231.81, 316.7; 24/129 R, 552, 563, 546, 457; 135/68.3; 174/72 A
See application file for complete search history.

(56) References Cited

U.S. PATENT DOCUMENTS

| | | | | |
|---|---|---|---|---|
| 2,840,629 A | * | 6/1958 | Roth et al. ................. 174/395 |
| 4,379,536 A | * | 4/1983 | Mizuno et al. ................ 248/73 |
| 4,614,321 A | * | 9/1986 | Andre ........................ 248/74.2 |
| 5,108,063 A | | 4/1992 | Koerber, Sr. et al. |
| 5,292,013 A | * | 3/1994 | Earl ............................. 248/73 |
| 5,511,973 A | * | 4/1996 | Ray ........................... 431/191 |
| 5,803,654 A | * | 9/1998 | Spease et al. ............... 403/384 |
| 5,904,325 A | * | 5/1999 | Hung ........................ 248/74.4 |
| 6,015,120 A | | 1/2000 | Sweere et al. |
| 6,408,492 B1 | * | 6/2002 | Sparks et al. ................. 24/336 |
| 6,719,253 B2 | | 4/2004 | Oddsen, Jr. |
| 6,983,917 B2 | | 1/2006 | Oddsen, Jr. |
| 7,093,858 B1 | * | 8/2006 | Russell ........................ 285/28 |
| 2004/0104315 A1 | * | 6/2004 | Betz ........................ 248/74.2 |

* cited by examiner

*Primary Examiner*—A. Joseph Wujciak, III
(74) *Attorney, Agent, or Firm*—Nexsen Pruet, LLC; Amy Allen Hinson

(57) ABSTRACT

An inner or lower arm for a spring loaded parallelogram support arm having a trough-like depression on the lower surface. A resilient U-shaped girdle having a plurality of projections attached through slots in the bottom surface of the arm to hold and route cables running to a plasma screen supported by the device.

9 Claims, 1 Drawing Sheet

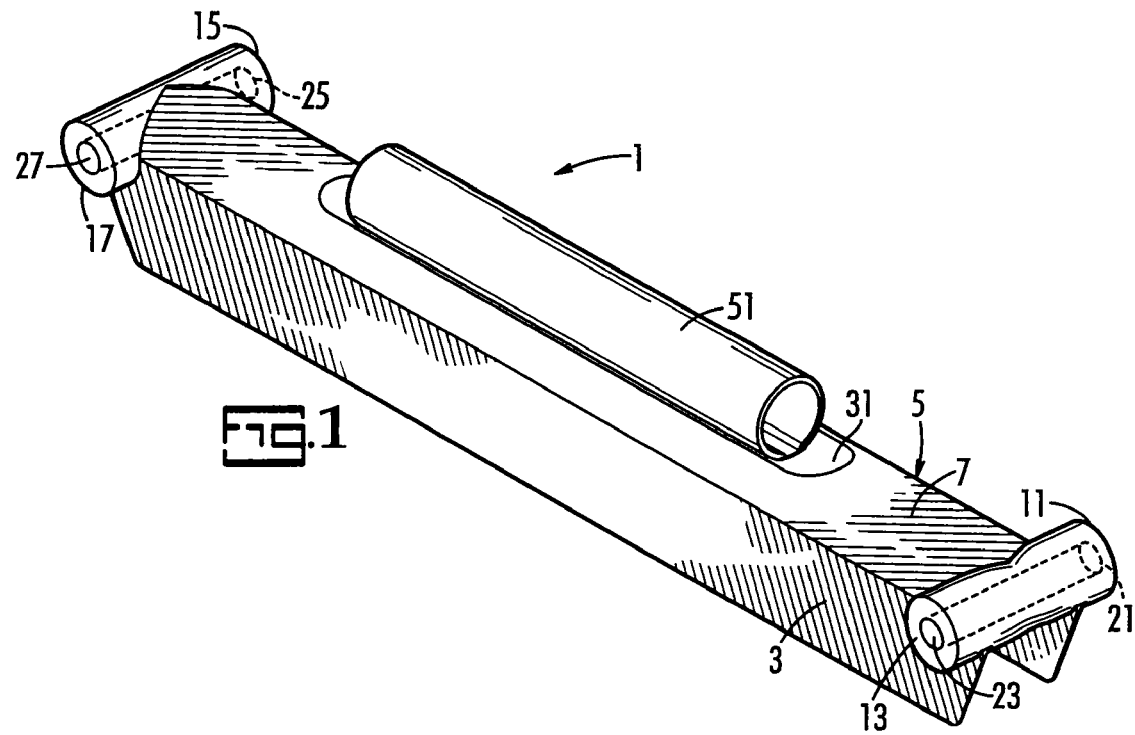
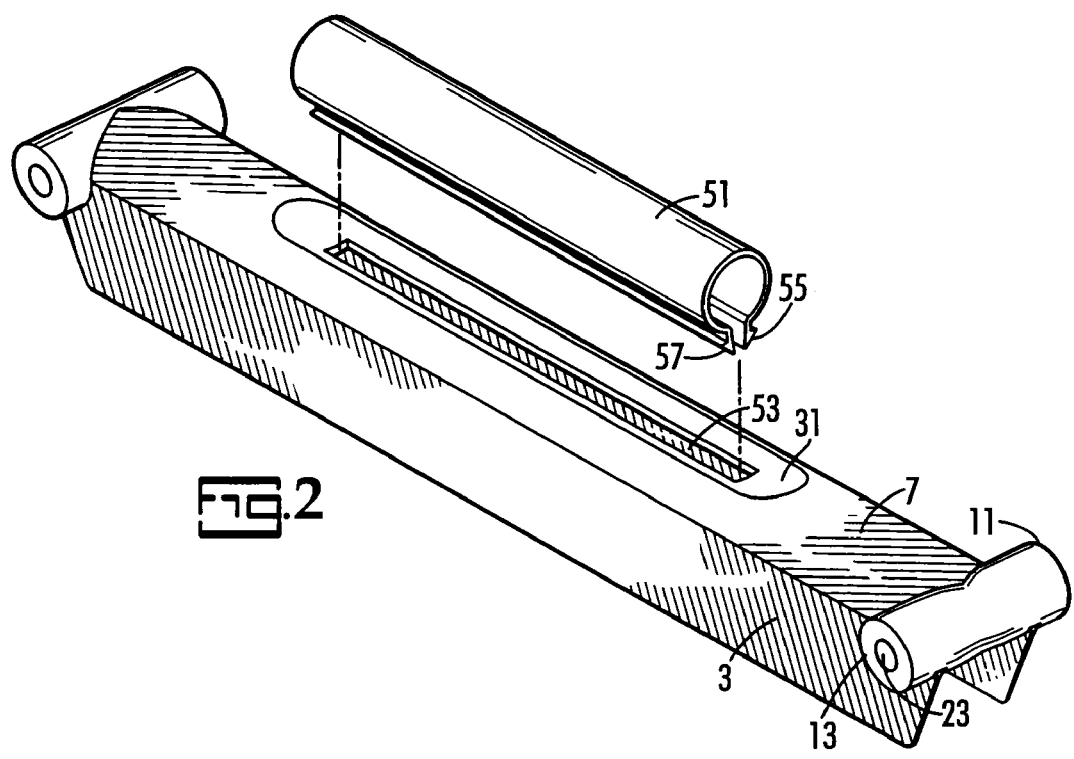

LOWER ARM FOR FPM SUPPORT HAVING INDENTED CABLE TRAY SUPPORT

FIELD OF THE INVENTION

This invention related to cable routing structures used in conjunction with support arms for flat panel monitors (FPM).

BACKGROUND AND PRIOR ART

Flexible supports for mounting television screens and computer monitors were limited by the size and weight of cathode ray tube display screens. U.S. Pat. No. 5,108,063 to Koerber et al. is illustrative of the problems and the sometimes ungainly solutions. Flat panel monitors, with reduced weight and depth and greater screen size availed multiple opportunities to provide enhanced flexibility of movement with a reduced footprint. U.S. Pat. No. 6,015,120 to Sweere et al. illustrates one option for such displays.

Cable routing from a signal generator to the display must vary with the thickness and flexibility of the cable provided with the display system and thus the number of wires required and how they are threaded to the screen is rarely shown in advertising for display arms. Attempts to route cables internally within parallelogram arms and swivel turrets and the ends of the arms, as disclosed in U.S. Pat. Nos. 6,719,253 and 6,983,917 have largely been failures and products corresponding to those patents have been superseded. Thicker, less flexible cables are difficult to route through narrow passageways around gas springs and integral plug connectors must be removed during routing and reattached. As a result, sling-type devices are preferred which are suspended from the lower, inner channel arms used in typical parallelogram-type support arms.

Early channel guides had slots along the bottom face into which cables could be pushed so as to be partially concealed and a plastic tray was clamped or snapped under the cable using a pair of flanges at the sides of a concave tray to slide over the edges of the slots. Larger cables required larger trays until the tray, not the slot, became the cable path.

BRIEF DESCRIPTION OF THE INVENTION

It is a first purpose of this invention to provide a more accessible routing of cables along the bottom of a lower channel. It is a second object of this invention to provide a stronger and cleaner lower channel. It is a third object of this invention to provide a lower channel for a support arm system which is stronger and easier to cast and machine.

These and other objectives of this invention can be obtained by forming a lower channel for a support arm having a concave, or upwardly facing when in place, trough or channel section with a rounded bottom joining section and substantially parallel sides. At the ends of the channel, across the base of the channel, is a pair of bosses preferably cast into the section. Suitable holes are formed in these bosses to support axle pins which connect the channel to end pieces or brackets which form the mounting and articulation points for the support arm and devices.

The lower exterior portion of the channel (bottom) is formed with a recessed trough having radiused ends. One or more slots are formed at the sides of the arch or at the middle (keystone) to receive tabs or flanges from a cable girdle. The cable girdle is generally tubular with flanged ends along the margins.

BRIEF DESCRIPTION OF THE DRAWINGS

FIG. 1 is a perspective view of the channel arm of this invention with the cable girdle in place.

FIG. 2 is a perspective view of the channel arm of this invention with the cable girdle partially removed.

DETAILED DESCRIPTION OF THE INVENTION

The invention is an inner or lower channel arm for a parallelogram type support system particularly adapted for use with flat panel display screens. It is an alternative to the inner arm (7) shown in U.S. Pat. No. 6,758,454 and similar arm support system. The channel is stronger than similar arms having a wide cut-away trough in the joining (bottom) portion of the channel, is easier to clean, and readily adapts to different sizes and numbers of cables.

In a first embodiment the arm 1 consists of two side sections 3, 5, a joining section 7, bosses 11, 13, 15 17, formed at the ends. Bosses have holes 21, 23, 25, 27 formed therein typically drilled to accept axles with or without pressed in bushings.

A trough 31 having an arcuate (concave) shape in cross-section and radiused ends 33, 35 is formed with joining section. Slots 53 are formed at the junction of the trough to receive projection 55, 57 from a girdle or cable tray 51.

The slots are open to the inside of the arm and receive projection 55, 57 protruding from girdle 51. These projections hold the girdle in place to support cables slung under the arm between signal source and flat screen.

As shown in FIG. 3 the girdle 51 is formed from a resilient material such as an engineering plastic including polyurethane, polypropylene, polyethylene or polystyrene to have a flexibility or spring which urges the projections directed outwardly to engage the inward surfaces of slot 53. Equally useable but less conveniently made would be thin metal girdles of Al or mild steel. Cables may be run, added or removed by squeezing the girdle to remove, laying the cable into the girdle and reattaching. End connectors may be left in place because the cable ends are not run through any structures, as required in some prior art.

The arm and cable guide of this invention are useful in any location where flat screens are used including most business offices and most manufacturing and repair locations and for the home office.

The invention has been described in terms of preferred embodiments. Alterations and modifications apparent to those with skill in the art are within the scope of this invention.

I claim:

1. An arm for a parallelogram type spring loaded support arm to retain a cable for flat screen displays, said arm comprising:

two parallel sides;

a joining surface attached to and connecting said two parallel sides, said joining surface having formed therein a central concave depression having a midline, said depression having a longitudinal slot formed therein along said midline, said joining surface having a first end and opposing second end;

a first boss attached to said joining surface at said first end;

a second boss attached to said joining surface at said second end; and a girdle formed of a resilient material, said girdle having a tubular shape and having two projections extending therefrom, said two projections having flared distal ends dimensioned to be received in said longitudinal slot so that, once said flared distal ends are received in said longitudinal slot, said distal ends tend to stay in said longitudinal slot unless manually removed, wherein said first boss has a first hole extending laterally therethrough and said second boss has a second hole extending laterally therethrough.

2. The arm as recited in claim 1, wherein said longitudinal slot is substantially the length of said depression.

3. The arm as recited in claim 1, wherein said girdle has a longitudinal seam.

4. The arm as recited in claim 3, wherein said projections extend from along said longitudinal seam.

5. An arm for a parallelogram type spring loaded support arm to retain a cable for flat screen displays, said arm comprising:

two parallel sides;

a joining surface attached to and connecting said two parallel sides, said joining surface having a longitudinal slot formed therein, said joining surface having a first end and opposing second end;

a first boss attached to said joining surface at said first end;

a second boss attached to said joining surface at said second end; and a girdle formed of a resilient material, said girdle having a tubular shape, a longitudinal seam, and at least one projection extending therefrom, said at least one projection dimensioned to be received in said longitudinal slot, wherein said first boss has a first hole extending laterally therethrough and said second boss has a second hole extending laterally therethrough, wherein said joining surface has formed therein a central concave depression having a midline, said longitudinal slot being formed at said midline.

6. The arm as recited in claim 5, wherein said at least one projection extends from along said longitudinal seam.

7. The arm as recited in claim 5, wherein said at least one projection has a flared distal end.

8. The arm as recited in claim 5, wherein said girdle includes a second projection extending therefrom.

9. An arm for a parallelogram type spring loaded support arm to retain a cable for flat screen displays, said arm comprising:

two parallel sides;

a joining surface attached to and connecting said two parallel sides, said joining surface having a longitudinal slot formed therein, said joining surface having a first end and opposing second end wherein said longitudinal slot is substantially the length of said depression;

a first boss attached to said joining surface at said first end;

a second boss attached to said joining surface at said second end; and a girdle formed of a resilient material, said girdle having a tubular shape, a longitudinal seam, and at least one projection extending therefrom, said at least one projection dimensioned to be received in said longitudinal slot, wherein said first boss has a first hole extending laterally therethrough and said second boss has a second hole extending laterally therethrough, wherein said joining surface has formed therein a central concave depression having a midline, said longitudinal slot being formed along said midline.

\* \* \* \* \*